Sept. 26, 1967
C. P. COLDREN
3,343,580
SELF-LOCKING FASTENER DEVICE
Filed May 14, 1965
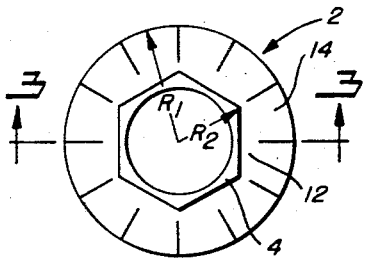
Fig. 1
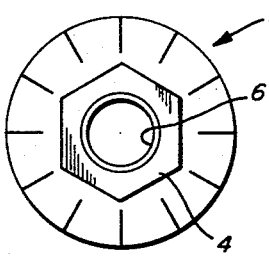
Fig. 4
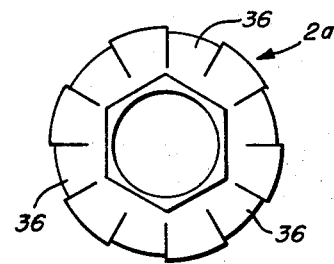
Fig. 6
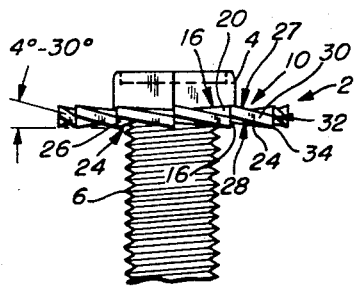
Fig. 2
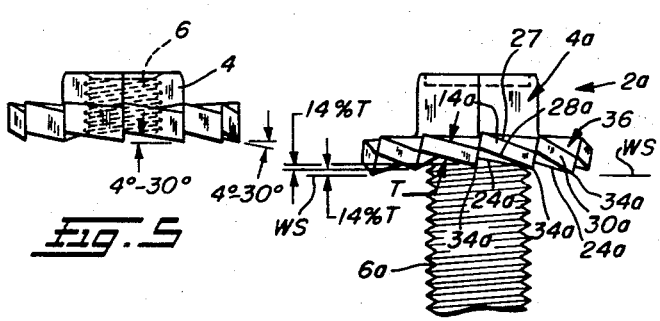
Fig. 5
Fig. 7
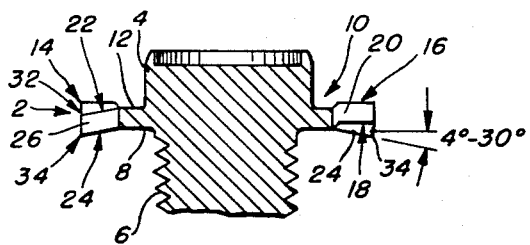
Fig. 3
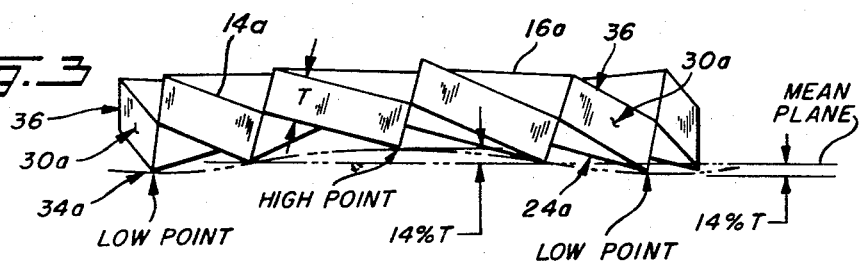
Fig. 8
INVENTOR
CHESTER P. COLDREN
BY *Seagrs, Sadler & Toldy*
ATTORNEYS

United States Patent Office 3,343,580
Patented Sept. 26, 1967

3,343,580
SELF-LOCKING FASTENER DEVICE
Chester P. Coldren, Canton, Ohio, assignor to Eaton
Yale & Towne Inc., a corporation of Ohio
Filed May 14, 1965, Ser. No. 455,876
1 Claim. (Cl. 151—37)

This invention relates to a self-locking fastener and more particularly to a self-locking fastener having flange means to automatically effect a self-locking action against rotation, thereby retarding retrograde or regressive rotation of the fastener.

In the past, numerous fastener and twisted tooth lockwasher assemblies have been proposed. However, in these previous assemblies the lockwasher is positioned intermediate the fastener bearing surface and a working surface to which the fastener was being applied. Accordingly, as the fastener is tightened, the twisted teeth of the lockwasher are compressed between the fastener bearing surface and the working surface, to the extent that the elastic limit of the twisted teeth is exceeded and result in a collapsing of the lockwasher teeth. This loss of resiliency on the part of the lockwasher teeth would naturally result in a reduction of the locking characteristics of the fastener and lockwasher assembly. Thus in the previous fastener and lockwasher assemblies the anchoring and holding characteristics leave much to be desired.

The present invention is concerned primarily with the provision of a new and simple fastener unit in which a washer or flange element is provided with a bearing surface, preferably integrally formed with the body of the fastener. To this end, a washer or flange member extends radially outwardly a substantial distance from the body member of the fastener, thus presenting an outer axially deflectable locking portion, one side of which is in locking engagement with a working surface.

Another object of the present invention is to provide a novel self-locking fastener which is relatively easy to form by mass production techniques and has a lockwasher or flange element which has radially extending locking tabs integral therewith.

Another object of the present invention is to provide a new and novel self-locking fastener with a resilient locking portion having improved locking and holding properties, wherein the torque required to apply the fastener is substantially less than the torque required to release the fastener from a working surface.

A further object of the invention is to provide a novel self-locking fastener having a twisted tab type locking portion wherein only three tabs approach and may possibly exceed their elastic limit upon application to a working surface.

A better understanding of the invention will be afforded by the following detailed description considered in conjunction with the drawing in which:

FIGURE 1 is a plan view of the novel self-locking fastener embodying the principles of this invention;

FIGURE 2 is a side elevational view of the fastener of FIGURE 1;

FIGURE 3 is a sectional view taken along line 3—3 of FIGURE 1 and showing the configuration of the tab members;

FIGURE 4 shows a slightly modified form of the self-locking fastener;

FIGURE 5 is an elevation of FIGURE 4 showing the configuration of the teeth or tab elements;

FIGURE 6 shows another modification of the self-locking fastener device;

FIGURE 7 is an elevational view of the modified version shown in FIGURE 6;

FIGURE 8 is an enlarged side view of the modification of the locking tab elements shown in FIGURE 7.

In general, the objects of this invention are met by providing an elongated fastener body having a flange element which is preferably integral therewith, and with said flange element having a plurality of radially extending canted or twisted teeth or tab elements on the outer periphery and with said tab elements being remote from the body portion of said fastener member. As the fastener is applied to a working surface, the corners or points of the locking tab elements initially contact the surface and as torque is increased, in a tightening direction, the point contact of the tab elements is gradually converted into a line contact upon complete securement of the fastener to a working surface.

Referring to FIGURES 1–5 of the drawing, the self-locking fastener 2 comprises an elongated body portion 4 having securing means which comprises a threaded portion 6. Said body portion 4 has a laterally or radially extending portion 8 which functions as a bearing area. A flange or washer member 10 has a marginal portion or area 12 adjacent the body portion 4 which connects a plurality of segments, or finger-like teeth or tab elements 14 to the body portion 4. The tab elements project substantially radially from the geometric axis of said fastener 2. The closely adjacent or contiguous tab elements 14 are formed by radially extending slots or slits in the periphery of flange member 10. The substantially contiguous tab elements 14 are characterized by an upper leading edge 16 and a lower leading edge 18 which defines a leading surface area 20; and an upper trailing edge 22 and a lower trailing edge 24 which defines a trailing surface area 26 therebetween. The upper leading edge 16, the lower leading edge 18, and the upper trailing edge 22, the lower trailing edge 24 are interconnected by an upper lateral edge 27 and a lower lateral edge 28 respectively, with the upper and lower lateral edges 27 and 28 defining a lateral surface area 30 therebetween. The upper and lower lateral edges 27 and 28 intersect the upper and lower trailing edges 22 and 24 to define points 32 and 34 respectively. The upper and lower edges of the leading surface 20 are substantially parallel, and likewise, the upper and lower edges of the lateral surface 30 and trailing surface 26 are substantially parallel.

The independent tab elements 14, are formed in the periphery of the annular flange member 10, and are adapted for locking engagement with a working surface WS on only one side of said flange member. The teeth or tab elements 14 may be broadly described as having a twisted configuration which are resiliently deformable when sufficient torque is applied as the fastener is tightened. However, the tab elements 14 cannot deform to the extent that lower leading edge 18 which is axially displaced with respect to bearing surface 8 (FIGURE 3) will contact the working surface to which the fastener is being applied. Accordingly, the total locking surface of tab element 14 never completely engages the working surface which it engages.

As illustrated in FIGURE 3, it is preferable to have the upper and lower trailing edges 22 and 24 and the upper and lower lateral edges 27 and 28 angularly inclined. In the preferred embodiment, the upper and lower trailing edges 22 and 24 of the tab elements 14 extend from points 32 and 34 respectively toward the geometric axis, with the trailing edges 22 and 24 forming an angle having a range between a minimum of 4° to a maximum of 30° relative to a radial plane passed normal to said geometric axis. The lateral edges 27 and 28 likewise form an angle having a range between a minimum of 4° to a maximum of 30° with the same plane as shown in FIGURE 2.

However, in the preferred embodiment the trailing edge 24 creates an acute angle having a range between a minimum of 5° to a maximum of 15° relative to a plane passed normal to said geometric axis. Preferably, the lateral edge 28 also defines an acute angle having a range between a minimum of 5° to a maximum of 15° with said plane.

The radial dimension $R_1$ of flange member 10 is greater than the radial dimension $R_2$ of the elongated body portion 4. Accordingly, the resilient locking tabs 14 are disposed radially beyond the bearing portion 8 of the body portion 4.

In FIGURES 6 and 7, I have illustrated a modified self-locking fastener 2a which is substantially similar to the self-locking fastener of FIGURES 1–5 except for the sinuous configuration of the locking tabs as disclosed in FIGURES 7 and 8. Hence, the parts of the fastener 2a of FIGURES 6 and 7 corresponding to parts of fastener 2 of FIGURE 1 will be referred to by the same reference numerals with the suffix a added thereto.

The only difference between the modification illustrated in FIGURES 6 and 7 and the above described self-locking screw is the sinuous or undulated configuration of the locking tabs as shown in FIGURE 7. In this modification there are at least three (3) lead or pilot tabs 36 which initially contact a working surface WS. This modification achieves a better reactive range of the locking tabs by allowing three angularly spaced lead tabs 36 to initially contact a working surface WS. Accordingly, as the three pilot or lead points 34a are transformed into line contact, the intermediate teeth 14a will sequentially effect a point contact with the working surface WS and thus an initial tightening torque will be increased from a minimum to a maximum. The intermediate tabs 14a form a sinuous curve with the lowermost tabs 36 with the height or amplitude of said curve with respect to a mean plane being a maximum of 14% of the tooth thickness as represented by T in FIGURE 8. Therefore, only the three pilot tabs 36 will approach or possibly be stressed beyond their elastic limit and the remaining or intermediate tabs 14a will function to effectively maintain and create a resilient locking area between the elongated fastener body 4a and a working surface WS. By this structure, only the points or corners 34a of the three pilot tabs 36 will initially engage a work piece to permit easy tightening of the fastener until such time as the three above noted tab elements 36 become sufficiently deflected to permit engagement of the intermediate tab or finger-like tab elements 14a.

The minimum number of resilient locking tabs 14a and 36 which may be employed in applicant's device is six tabs, comprising three pilot tabs 36 and three intermediate tabs 14a; however, any number of locking tabs above the minimum requirement may be employed. Therefore, the angular spacing or positioning of the three pilot or lead tabs 36 may vary as a function of the total number and width of the tabs 14a and 36 that are employed.

It is readily apparent, that if the trailing edge 24a of pilot tabs 36 are inclined inwardly at an angle of 15° with respect to a horizontal plane passed perpendicular to the geometric axis of the fastening device 2a, the intermediate locking tabs 14a have a trailing edge 24a which is inclined at a lesser angle with respect to said horizontal plane.

From the above description, it is readily seen that the present invention has provided a novel self-locking fastener wherein the tightening torque is substantially less than the torque required to remove the fastener from a working surface. To reiterate, the body of the fastener has a flange element integral therewith which extends radially outwardly a substantial distance from the fastener body. A plurality of twisted tab elements are positioned on the flange element in such a manner whereby the force or torque required to apply the fastener to a working surface is gradually increased from a minimum to a maximum.

Although a particular preferred embodiment of the invention has been disclosed above for illustrative purposes, it will be understood that variations or modifications thereof which lie within the scope of the appended claim are fully contemplated.

The embodiments of the invention in which an exclusive property or privilege is claimed are defined as follows:

In a self-locking threaded fastener of the type used with mating threads to hold a workpiece having in combination, a tool engageable head portion, a radially extending flange portion, the flange portion having a substantially planar bearing surface, and a threaded portion extending along an axis away from the flange portion; the improvement comprising:

a plurality of tabs dependent from the bearing surface, the tabs being canted about an axis normal to the axis of rotation of the fastener such that one edge of the tabs is raised above the bearing surface and another edge is lowered below the bearing surface;

successive tabs being varyingly canted such that the lowermost points of the tabs form a sinusoidal curve throughout the entire circumferential extent of the flange; and one radial edge of the canted tabs being inclined with respect to the axis of rotation of the fastener;

whereby, as the fastener is tightened into engagement with the workpiece, first contact of the fastener with the workpiece will be point contact by the lowermost point of the tabs, continued tightening resulting in transformation of that point contact into line contact along the inclined radial edge and a portion of the peripheral edge of the tabs.

References Cited

UNITED STATES PATENTS

| | | | |
|---|---|---|---|
| 1,956,745 | 5/1934 | Payne | 151—37 |
| 2,226,491 | 12/1940 | Gustafson | 151—37 |
| 2,731,057 | 1/1956 | Poupitch | 151—35 |

FOREIGN PATENTS

| | | |
|---|---|---|
| 531,701 | 1/1941 | Great Britain. |

CARL W. TOMLIN, *Primary Examiner.*

R. S. BRITTS, *Assistant Examiner.*